United States Patent [19]

Manewald

[11] Patent Number: 5,264,897
[45] Date of Patent: Nov. 23, 1993

[54] WET SCANNING GATE AND USE OF THE SAME FOR THE PRODUCTION OF ENLARGEMENTS OF INDIVIDUAL PHOTOGRAPHIC NEGATIVES OR SLIDES

[75] Inventor: Ingrid Manewald, Abensberg, Fed. Rep. of Germany

[73] Assignee: Andreas Schmitzer, Kehlheim, Fed. Rep. of Germany

[21] Appl. No.: 888,602

[22] Filed: May 27, 1992

[30] Foreign Application Priority Data

May 27, 1991 [DE] Fed. Rep. of Germany ....... 4117217

[51] Int. Cl.$^5$ .............................................. G03B 27/52
[52] U.S. Cl. ...................................... 355/30; 352/222
[58] Field of Search .......................... 352/222; 355/30

[56] References Cited

U.S. PATENT DOCUMENTS

| | | | |
|---|---|---|---|
| 2,890,621 | 6/1959 | Suits | 355/30 |
| 3,614,223 | 10/1971 | Ott | 355/30 |
| 3,776,626 | 12/1973 | Lewis | |
| 4,082,447 | 4/1978 | Pascuzzi | 355/30 |
| 4,223,985 | 9/1980 | Carter et al. | 352/122 |
| 4,279,055 | 7/1981 | Jaggi et al. | 355/30 |

FOREIGN PATENT DOCUMENTS 4032016 4/1992 Fed. Rep. of Germany.

OTHER PUBLICATIONS

AGFA MSP Multi Scanning Printer.

*Primary Examiner*—Monroe H. Hayes
*Attorney, Agent, or Firm*—Spencer, Frank & Schneider

[57] ABSTRACT

A wet scanning gate for use in the production of enlargements from picture material in the form of individual photographic negative images or transparencies connected to form a contiguous strip has a two-part housing defining a channel through which the contiguous strip is drawn. The two-part housing, includes an optional gate along the channel; supply structure for filling the optical gate with a liquid having the same optical refractive index as the picture material; liquid extraction zones disposed along the channel upstream and downstream of the optical gate, the extraction zones upstream and downstream of the optical gate including groups of stripper lips placed against top and bottom faces of the contiguous strip, a plurality of common carriers each for supporting a respective one of the groups of stripper lips, each common carrier being mounted for raising and lowering an associated group of stripper lips, and a plurality of bellows each disposed between a respective one of the common carriers and one or the other of the parts of the two-part housing, each bellows being actuatable for moving a respective one of the common carriers and the associated groups of stripper lips toward or away from the channel; and a drying zone disposed along the channel downstream of the extraction zone downstream of the optical gate.

5 Claims, 3 Drawing Sheets

WET SCANNING GATE AND USE OF THE SAME FOR THE PRODUCTION OF ENLARGEMENTS OF INDIVIDUAL PHOTOGRAPHIC NEGATIVES OR SLIDES

CROSS REFERENCE TO RELATED APPLICATIONS

The present application claims the rights of priority with respect to application Ser. No. P 41 17 217.5 filed May 27th, 1991 in Germany, the subject matter of which is incorporated herein by reference.

BACKGROUND OF THE INVENTION

The present invention relates to a wet scanning gate and its use in the production of enlargements of individual photographic negatives or transparencies (slides). A wet scanning gate of this type is disclosed in the unpublished German Patent Application P 40 32 016.2.

U.S. Pat. No. 3,776,626 discloses a wet copying device, which, like the above noted prior art wet scanning gate, serves to wet the top and bottom surfaces of the film material during passage of surface damaged film material through the gate of the film copying machine or film scanner with a liquid which has the same optical refractive index as the film material. This liquid completely fills the scrapes and scratches present on the film surface so that they are no longer included in film copy or electronic image signal. These devices, which are configured as closed systems, include a chamber equipped with extraction zones upstream and downstream of the optical gate as well as a drying zone following the downstream extraction zone to prevent escape of the perchloroethylene, employed as the liquid, into the environment. The liquid is injected immediately upstream and downstream of the optical gate onto the top and bottom surfaces of the film material in a direction oblique to the film surface.

For the production of paper enlargements of individual photographic negatives it is likewise desirable to make damages to the negative surface invisible. Although prior art enlargers (see in-house brochure by Agfa-Gevaert entitled "Multi Scanning Printer") are configured similarly to film copying machines, that is, the photographic negatives are assembled into a coiled strip and are pulled in steps or continuously in parallel with a strip of photographic paper through the beam path of a light source and enlarging lenses, the wet copying technique that has been known for several decades has not been employed in enlargers. Existing differences between the film drives which employ film gripping pins or friction rollers and the drives for the coiled strip in the form of friction rollers cannot be considered as the reason for the lack of use of the wet copying process at least not for the wet scanning process, since the film scanners employed for wet scanning also drive the film by means of a friction roller. The more probable explanation for the lack of use of wet copying and wet scanning in enlargers is that the gluing together of photonegatives into a strip does not produce a strip that is comparable to a film. That is, while a film has a completely smooth surface, a glued-together strip of negatives is more or less heavily corrugated. Thus, when pulled through the prior art wet copiers or wet scanning devices, the glued-together strip of negatives is subjected to relatively high friction forces and thus high tensile stresses because of the small thickness of the transporting channel existing there, which may result in a tearing apart of the glued sections between the individual negatives.

SUMMARY OF THE INVENTION

It is therefore an object of the present invention to provide a way, in the production of enlargements of photographic negatives and of transparencies, in which surface damage of the negatives or transparencies does not become visible in the resulting enlargements or transparencies.

The above and other objects are accomplished in accordance with the invention by the provision of a method of producing enlargements from individual photographic negative images or transparencies connected to form a contiguous strip, including: drawing the contiguous strip in steps or continuously through a wet scanning gate having a transporting channel of increased thickness sufficient to accommodate corrugations present in the contiguous strip; and positioning the wet scanning gate in an optical beam path between a light source and either a strip of photopositive paper or a transparency film.

In a accordance with another aspect of the invention there is provided a wet scanning gate for use in the production of enlargements from picture material in the form of individual photographic negative images or transparencies connected to form a contiguous strip, comprising: a two-part housing defining a channel through which the contiguous strip is drawn, the two-part housing including an optical gate along the channel, means for filling the optical gate with a liquid having the same optical refractive index as the picture material, liquid extraction zones disposed along the channel upstream and downstream of the optical gate, a drying zone disposed along the channel downstream of the extraction zone downstream of the optical gate, and an intermittently operating pressure device for applying contact pressure to individual photographic negative images or transparencies of the strip stationarily positioned in the optical gate.

The present invention is based on the concept that in the production of enlargements of photographic negatives and of transparencies the surface of the picture material (photographic negative or transparency) is wetted on all sides with a liquid whose optical refractive index is essentially the same as the optical refractive index of the material of the negative or transparency. For this purpose, a modified wet scanning gate is employed whose transporting channel has a greater thickness than the prior art wet scanning gates so that the waviness of the glued-together strip of pictures cannot cause interference in the transporting process. To ensure accurate positioning of the master pictures in the optical plane of the optical gate in spite of the thicker transporting channel, the wet scanning gate configured according to the present invention is provided with a special film press-on device which, during the step-wise advance of the individual photographic negatives or transparencies, applies a contact pressure thereto while they are stationarily positioned in the optical gate. On the other hand, it has been surprisingly found that if the picture material is advanced continuously, the contact pressure device is not required.

The invention will now be described in greater detail with reference to the drawing figures.

DETAILED DESCRIPTION OF PREFERRED EMBODIMENTS

Figure 1:
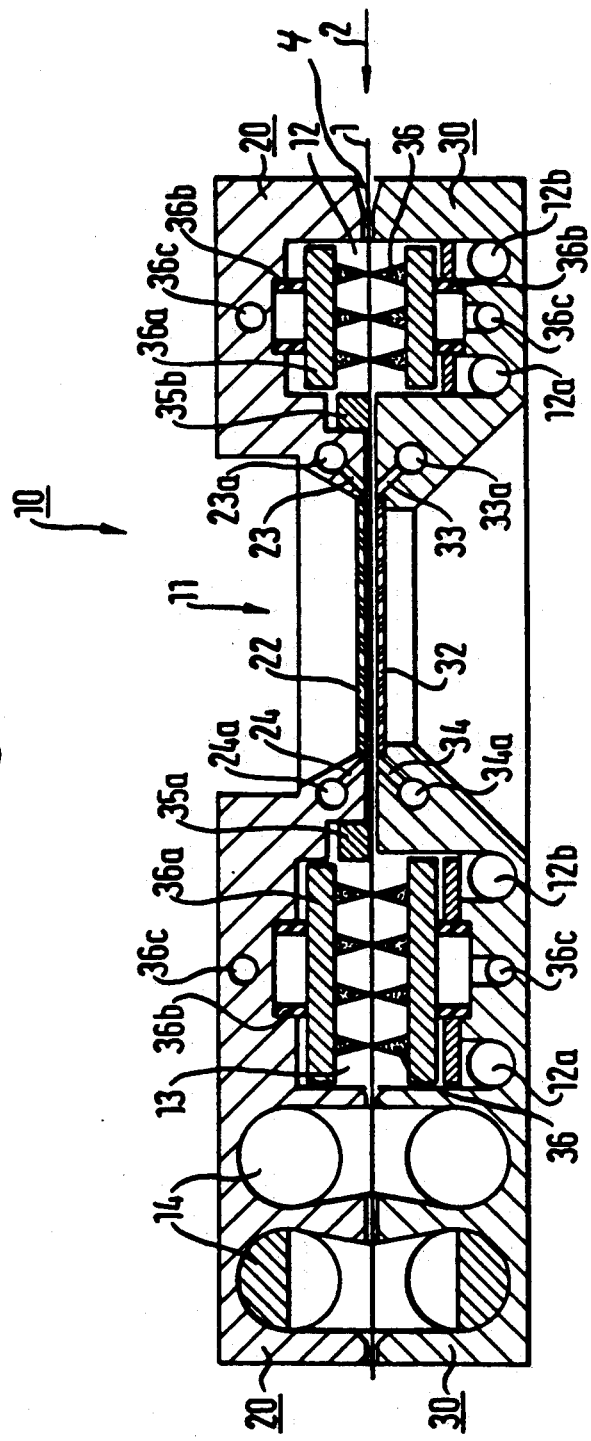
FIG. 1 is a longitudinal sectional view of an embodiment of a wet scanning gate according to the invention seen in a vertical section plane of the two-part housing and in the transporting direction of the picture material.
Figure 2:
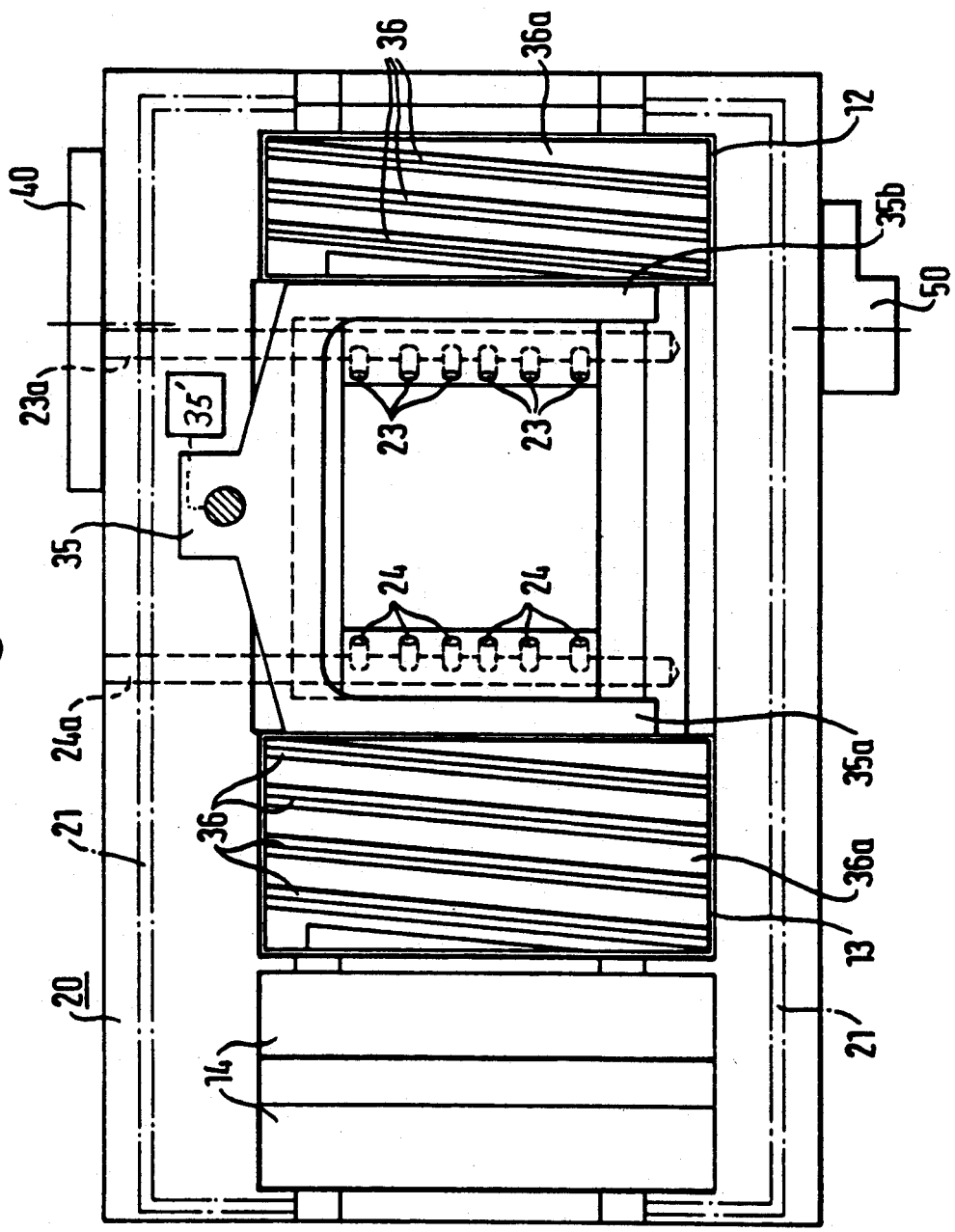
FIG. 2 is a top view of the top of the wet scanning gate of FIG. 1, seen from the parting plane between the top and bottom parts of the two-part housing.

Referring to FIGS. 1 and 2, the illustrated wet scanning gate 10 includes a two-part housing comprising a top 20 and a bottom 30 (FIG. 1) which define in their separating plane a guide channel 4 for passage, in the direction of arrow 2, of a contiguous strip 1 composed of individual glued-together photographic negative images or transparencies. In the edge regions, top 20 and bottom 30 lie matchingly on top of one another with a seal 21 (FIG. 2) pressed into top 20 and forming a seal between top 20 and bottom 30. To provide a preferably releasable connection between top 20 and bottom 30, a closing member 40 is provided on one long side of the approximately rectangular top 20 and bottom 30 and a bar 50 on an oppositely disposed long side as seen in detail in FIGS. 3 and 4 and generally in FIG. 2.

Figure 3:
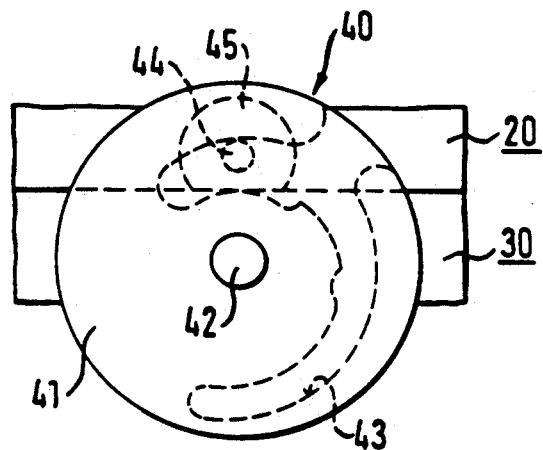
FIG. 3 is a schematic view of a closing member for the device of FIGS. 1 and 2 for closing the top and bottom with parts with a variable closing force.

As can be seen in detail in FIG. 3, closing member 40 includes a cam disc 41 which is rotatably mounted on a shaft 42 fastened to bottom 30. A connecting member 43 of cam disc 41 engages a pin 44 of a pin disc 45 fastened to top 20 so as to be secure against rotation. Connecting member 43 opens at a location toward the edge of cam disc 41 in order to remove pin 44 from engagement with connecting member 43 and allow top 20 and bottom 30 to be taken apart. Moreover, connecting member 43 has such a configuration that a force which is a function of the angular position of cam disc 41 acts on pin 44. This corresponds to a corresponding control of the pressure force between top 20 and bottom 30.

Figure 4:
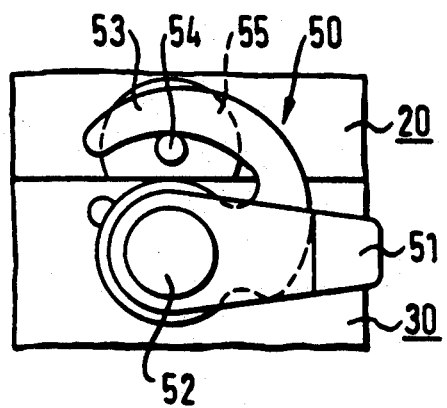
FIG. 4 is a schematic view of a locking bar for the device of FIGS. 1 and 2 for locking the top and bottom parts on the long side disposed opposite the closing member of FIG. 3.

As can be seen in FIG. 4, bar 50 includes a lever 51 which is mounted at bottom 30 so as to be rotatable about a stationary axis 52 and whose locking finger 53 grips over a pin 54 of a pin disc 55 that is fastened to top 20 in a manner secure against rotation. If lever 51 is pivoted clockwise out of the illustrated locking position, locking finger 53 releases pin 54 so that, with locking member 40 open, top 20 can be removed from bottom 30.

Referring again to FIGS. 1 and 2, wet scanning gate 10, which according to the description above forms a two-part housing, includes an optical gate 11 that is positioned in the beam path between a light source (not shown) and a panel (not shown) of photographic paper (in the case of enlargements from photographic negatives) or transparency film (in the case of the copying of transparencies) guided in parallel with strip 1 and moving in synchronism therewith. The light source has an associated optical system (likewise not shown) as is customary in enlargers of the above-mentioned type.

Optical gate 11 is formed of two sapphire glass panes 22 and 32 which are arranged in parallel with the path of movement of strip ; and are attached to top 20 and bottom 30. A gap of a width of, for example, 0.4 to 1.2 mm exists between the two panes. Glass panes 22 and 32 define a liquid channel fed by injection openings 23 and 24 in top 20 and by injection openings 33 and 34 in bottom 30. Seen in the direction of arrow 2, openings 23 and 33 extend upstream of gate 11 transversely to the direction of movement of strip 1, while openings 24 and 34 are arranged downstream of the gate and likewise transversely to the direction of movement of strip 1 (FIG. 2). Openings 23,33 are tilted towards the surface of stop 1 in a direction whose horizontal component is in the direction of movement of strip 1. Opening 24,34 are also tilted towards the surface of strip 1 but in a direction whose horizontal component is opposite to the direction of movement of strip 1. Each row of openings is fed with liquid that is under a pressure of, for example, 0.3 to 0.5 bar from a common collective channel 23a, 24a, 33a, and 34a, respectively. Such liquid may be, for example, perchloroethylene which has the same optical refractive index as the material of the photographic negative or transparency to be enlarged and on which surface damage exists.

The described arrangement of openings 23, 24, 33, 34 ensures that a liquid cushion, free of air bubbles, forms in the liquid channel between glass panes 22 and 32, with the strip transporting velocity under consideration being, for example, 250 mm/s on the average. Air bubbles dragged from outside by strip 1 into the scanning gate 10 are extracted upstream of gate 11 by an extraction zone 12 to be described in greater detail below and thus do not reach gate 11.

The extraction zone 12 connected upstream of gate 11 is configured as a rectangular chamber having vacuum conduits 12a and 12b that open into its bottom. The subatmospheric pressure in vacuum conduits 12a and 12b is, for example, −0.5 bar. At the right edge of the liquid channel between glass panes 22 and 32 there thus results a pressure differential of about 1 bar if the liquid pressure is 0.5 bar. This pressure differential appears as an unsurmountable barrier to dragged-in air bubbles and prevents their entrance into the liquid channel between glass panes 22 and 32.

Within the chamber of extraction zone 12 groups of stripper lips 36 of an elastic material, e.g. rubber, are disposed—separately for each surface of strip 1. These stripper lips have an approximately wedge-shaped profile whose tip is oriented toward the surface of strip 1 and rests on the respective surface under a slight pressure. The lips, when viewed from the top in FIG. 2, extend at an angle of less than 90° relative to the direction of movement of strip 1, with the stripped liquid dropping to the bottom of the respective chamber and being extracted. Each group of stripper lips 36 is supported on a common holder 36a which, in turn, is supported on a rubber bellows 36b at the bottom or ceiling, respectively, of the chamber of extraction zone 12. Each bellows is connected with a vacuum conduit 36c so that, by selecting the vacuum in conduits 36c, the holders 36b and thus the stripper lips 36 can be raised and lowered When strip 1 is introduced into closed scanning gate 10, the stripper lips are raised in order to, on the one hand, facilitate introduction and, on the other hand, prevent damage to lips 36. Moreover, the fact that stripper lips 36 can be controlled permits a problem-free drying operation for scanning gate 10, that is, operation without the influx of liquid during which lips 36 remain in their raised position. Such a problem-free drying operation permits a permanent installation of the wet scanning gate in an enlarger and eliminates the otherwise required drying gates. In this way, the additional costs for a wet scanning gate are noticeably reduced.

Downstream of gate 11 there is a further extraction zone 13 which is configured and operated in the same manner as extraction zone 12. Corresponding components of extraction zones 12 and 13 bear the same reference numerals. The statements made above apply identically for the control of the stripper lips within extraction zone 13.

Following extraction zone 13, a two-stage drying chamber 14 is disposed within top 20 and bottom 30 and is provided with inlet openings for warm air and extraction openings for the evaporated liquid. Strip 1 leaves wet scanning gate 10 in a dry state so that the environment is protected against noxious liquid vapors and a friction belt drive for strip 1 following the wet scanning gate is able to operate without slip.

In order to ensure secure positioning of the individual pictures in the optical plane of gate 11, that is, on glass pane 32 when strip 1 is advanced in steps through wet scanning gate 10, a pressure device is provided in the region of gate 11 and is composed of a fork-shaped pressure plate 35 and a suitable drive mechanism 35', such as a pneumatic or electronic drive. A purely mechanical drive by way of cams or the like is also possible. The two arms 35a and 35b of pressure plate 35 grip around glass pane 22 and extend transversely to the direction of movement of strip 1 (arrow 2). Corresponding recesses for the pressure plate are provided in top 20; they are selected to be large enough to permit the pressure plate to be raised and lowered reliably. Pressure plate 35 is controlled in synchronism with the motion phases of strip 1. That is, when strip 1 comes to a stop, pressure plate 35 is lowered, and when strip 1 is caused to move, pressure plate 35 is raised. In this way, even a very wavy strip 1 is positioned accurately in gate 11.

It is understood that the present invention is not limited to the wet scanning device described as the preferred embodiment. For example, the wet scanning device may additionally include an annular vacuum channel which surrounds gate 11 and connects the two vacuum zones 12 and 13 with one another. Moreover, longitudinal skids of sapphire glass may be provided in the region of gate 11 so as to ensure longitudinal guidance of strip 1 in the sense of an even more accurate positioning of the individual pictures in gate 11.

The individual pictures combined into a strip 1 may exist on a contiguous roll of film, for example a 36-mm roll of film, with individual rolls of film being combined into a strip 1. In addition to gluing, the joining can also be done by means of welding which has the advantage that the liquid employed, e.g. perchloroethylene, is unable to attack or even dissolve the seams.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A wet scanning gate for use in the production of enlargements from picture material in the form of individual photographic negative images or transparencies connected to form a contiguous strip, comprising:
   a two-part housing defining a channel through which the contiguous strip is drawn, said two-part housing including:
   an optical gate along the channel; means for filling said optical gate with a liquid having the same optical refractive index as the picture material; liquid extraction zones disposed along the channel upstream and downstream of said optical gate, said extraction zones upstream and downstream of said optical gate including groups of stripper lips placed against top and bottom faces of the contiguous strip, a plurality of common carriers each for supporting a respective one of the groups of stripper lips, each said common carrier being mounted for raising and lowering an associated group of stripper lips, and a plurality of bellows each disposed between a respective one of the common carriers and one or the other of the parts of said two-part housing, each bellows being actuatable for moving a respective one of the common carriers and the associated group of stripper lips toward or away from the channel; and
   a drying zone disposed along the channel downstream of said extraction zone downstream of the optical gate.

2. A wet scanning gate as defined in claim 1, and further comprising a pressure device for applying contact pressure to individual photographic negative images or transparencies of the strip stationarily positioned in said optical gate, said pressure device including a fork-shaped pressure plate having arms arranged transversely to the direction of movement of the contiguous strip of picture material in the channel and gripping around the optical gate.

3. A wet scanning gate as defined in claim 1, further comprising drive means for raising and lowering said pressure device in synchronism with motion of said contiguous strip.

4. A wet scanning gate as defined in claim 1, wherein said two-part housing has opposite sides and further comprising first and second releasable closing means disposed on each of said opposite sides for releasably connecting the two parts of said two-part housing together, with at least one of said releasable closing means having a variable closing force.

5. A wet scanning gate as defined in claim 1, wherein said housing includes injection openings for the liquid disposed upstream and downstream of the optical gate, said injection openings being oriented obliquely toward the top and bottom faces of the contiguous strip.

* * * * *